United States Patent
Meynants et al.

(10) Patent No.: US 6,833,868 B1
(45) Date of Patent: Dec. 21, 2004

(54) METHOD AND DEVICE FOR DETERMINING CORRECTED COLOR ASPECTS OF A PIXEL IN AN IMAGING DEVICE

(75) Inventors: Guy Meynants, Dessel (BE); Bart Dierickx, Mortsel (BE)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 09/454,766

(22) Filed: Dec. 3, 1999

(30) Foreign Application Priority Data

Dec. 10, 1999 (EP) .......................................... 988702676

(51) Int. Cl.⁷ ................................................. H04N 3/14
(52) U.S. Cl. ....................... 348/272; 348/273; 348/280; 348/222.1
(58) Field of Search ................................ 383/162, 167; 358/512, 518, 520; 348/272, 273, 280, 222.1, 557, 712, 713

(56) References Cited

U.S. PATENT DOCUMENTS

| | | | |
|---|---|---|---|
| 4,597,007 A | * | 6/1986 | Reitmeier et al. .......... 348/670 |
| 5,652,621 A | | 7/1997 | Adams, Jr. et al. |
| 5,778,106 A | * | 7/1998 | Juenger et al. ............. 382/275 |
| 5,793,885 A | * | 8/1998 | Kasson ........................ 382/167 |
| 5,990,950 A | * | 11/1999 | Addison ...................... 348/273 |
| 6,563,537 B1 | * | 5/2003 | Kawamura et al. ......... 348/252 |
| 2003/0030729 A1 | * | 2/2003 | Prentice et al. ........... 348/220.1 |

FOREIGN PATENT DOCUMENTS

| | | |
|---|---|---|
| EP | 01302964 | 12/1989 |
| EP | 732859 | 9/1996 |
| GB | 2220817 | 1/1990 |

OTHER PUBLICATIONS

European Search Report, Jun. 5, 1999.

* cited by examiner

*Primary Examiner*—Tuan Ho
*Assistant Examiner*—Gevell Selby
(74) *Attorney, Agent, or Firm*—Knobbe, Martens, Olson & Bear, LLP

(57) ABSTRACT

The invention is a method for determining at least two corrected color values for a pixel, said pixel being embedded in a configuration of pixels and having a color filter for filtering substantially one color type while obtaining a measurement on the pixel. The method comprises the steps of measuring at least one signal on said pixel; transforming the measured signal into a representation having at least a luminance and a chrominance part; and transforming said representation into a color space representation of said pixel, said pixel having at least two color values in said color space representation.

9 Claims, 14 Drawing Sheets

| R | G | B |
|---|---|---|
| R | G | B |
| R | G | B |

Fig. 1a

| R | G | B |
|---|---|---|
| G | B | R |
| B | R | G |

Fig. 1b

Step 1: Calculate the low-pass filtered luminance of the image
(from the data of the pixel and its neighbor pixels)

Step 2: Calculate the chrominance of each pixel
(only the chrominance channel which corresponds with the color filter of the pixel)

Step 3: Interpolate chrominances in each pixel with a 'vote' operator
(use the chrominance data of a small set of pixels around the pixel)

Step 4: Calculate the high-resolution luminance data of each pixel
(from the chrominance and the sensor data of the pixel)

Step 5: Calculate the full color (RGB) image
(from the luminance and the chrominance data)

Fig:2

Consider a window of 11 pixels around the pixel the colour of which is to be determined.

Step 1: For the 9 middle pixels of this window
Calculate $Ylp(x) = [I(x-1) + I(x) + I(x+1)]/3$ $Ylp(x)$ is the low-pass filtered luminance of the pixel at position x.

Step 2 : Calculate for the 9 middle pixels of this window:

For additive color processing          For multiplicative color processing
$Chr(x) = I(x) - Ylp(x)$                $Chr(x) = I(x)/Ylp(x)$ $Chr(x)$ is the estimated chrominance of the pixel at position x which corresponds with the color of the pixel at position x 3 red, 3 green and 3 blue chrominances are calculated r1, r2, r3, b1, b2, b3, g1, g2, g3

Step 3 : Estimate from the 3 chrominances from a color channel the chrominances r,g,b of the pixel:
$r = vote\{r1, r2, r3\}$
$g = vote\{g1, g2, g3\}$
$b = vote\{b1, b2, b3\}$ Step 4 : Calculate full-resolution luminance Y
For additive color processing          For multiplicative color processing
$Y = I - \{r \text{ or } g \text{ or } b\}$         $Y = I/\{r \text{ or } g \text{ or } b\}$ Y is the luminance of the pixel that is interpolated
I is the pixel intensity of this pixel, measured by the image sensor
{r or g or b} : the chrominance which corresponds with the color filter of the pixel is chosen Step5 :   For additive color processing         For multiplicative processing
$R = Y + r$                                      $R = Y*r$
$G = Y + g$                                      $G = Y*g$
$B = Y + b$                                      $B = Y*b$

Fig. 4

The green pixel G5 needs to be interpolated. The pixel array looks as follows:

B0　R1　G2　B3　R4　G5　B6　R7　G8　B9　R10

Step 1 : Calculate Ylp

Ylp1 = {B0 + R1 + G2}/3　　Ylp2 = (R1 + G2 + B3)/3　　Ylp3=(G2 + B3 + R4)/3
Ylp4 = {B3 + R4 + G5}/3　　Ylp5 = (R4 + G5 + B6)/3　　Ylp6=(G5 + B6 + R7)/3
Ylp7 = {B6 + R7 + G8}/3　　Ylp8 = (R7 + G8 + B9)/3　　Ylp9=(G8 + B9 + R10)/3

Step 2 : calculate chrominance of each pixel r1 = R1/Ylp1　　　　g2 = G2/ylp2　　　　b3 = B3 / Ylp3
r4 = R4/Ylp4　　　　g5 = G5/ylp5　　　　b6 = B6 / Ylp6
r7 = R7/Ylp7　　　　g7 = G8/ylp8　　　　b9 = B9 / Ylp9

Step 3 : chrominance interpolation r=vote(r1,r2,r3)
　　　　g=vote(g1,g2,g3)
　　　　b=vote(b1,b2,b3)

Step 4 : calculate high-resolution luminance

Y=G5/g

Step 5 : calculate RGB data

Fig. 5

| Electrical specifications | | |
|---|---|---|
| signal range | 2-4 V | |
| Noise | < 1.3 mV | RMS variation on output |
| S/N ratio | 64 dB | 1670:1 |
| Pixel frequency | typ. 8 MHz | |
| Output data delay | 80 ns | after rising clock edge, 1 V swing, error < 10 mV |
| Rise time | 84 ns | 1 V swing, rising signal |
| Signal slew rate | 12 V/$\mu$s | |
| Dissipation | 100 mW | at 8 MHz including 3 output amplifiers |
| Dimensions | | |
| PR 16 cell | 1.7 x 1 mm$^2$ | without pads |
| PR 16 IO | 2.5 x 1.7 mm$^2$ | includes bond pads |
| Package | 28 pins DIL | |
| Process | 0.7 $\mu$m | analog/digital CMOS |

Fig. 7

| B1 | R2 | G3 |
|----|----|----|
| R4 | G5 | B6 |
| G7 | B8 | R9 |

Method for interpolating pixel at position 5:

1) Calculate a low-pass filtered image:
   Y2 = ( B1 + R2 + G3 )/3
   Y5 = ( R4 + G5 + B6 )/3
   Y8 = ( G7 + B8 + R9 )/3

2) Calculate chrominance of each pixel
   b1 = B1 - Y2      r2 = R2 - Y2      g3 = G3 - Y2
   r4 = R4 - Y5      g5 = G5 - Y5      b6 = B6 - Y5
   g7 = G7 - Y8      b8 = B8 - Y8      r9 = R9 - Y8

3) Interpolation
   r5* = median {r2, r4, r9}
   g5* = median {g3, g5, g7}
   b5* = median {b1, b6, b8}

4) Luminance of pixel 5
   Y5 = I5 - g5

5) RGB data of pixel 5
   R5* = Y5 + r5
   G5* = Y5 + g5
   B5* = Y5 + b5

Fig. 12

METHOD AND DEVICE FOR DETERMINING CORRECTED COLOR ASPECTS OF A PIXEL IN AN IMAGING DEVICE

FIELD OF THE INVENTION

The present invention relates to solid state imaging devices. More particularly, the present invention relates to the field of colour imaging sensors.

BACKGROUND OF THE INVENTION

Solid state image sensors are well known. Virtually all solid-state imaging sensors have as key element a photosensitive element being a photoreceptor, a photo-diode, a phototransistor, a CCD gate, or the like. Typically, the signal of such a photosensitive element is a current which is proportional to the amount of electromagnetic radiation (light) falling onto the photosensitive element.

A structure with a photosensitive element included in a circuit having accompanying electronics is called a pixel. Such pixel can be arranged in an array of pixels so as to constitute a sensor and to build focal plane arrays.

Commonly such solid state image sensors are implemented in a CCD-technology or in a CMOS- or MOS-technology. Solid state image sensors find a widespread use in devices such as camera systems. In this embodiment a matrix of pixels comprising light sensitive elements constitutes an image sensor, which is mounted in the camera system. The signal of said matrix is measured and multiplexed to a so-called video-signal.

Of the image sensors implemented in a CMOS/MOS-technology, CMOS/MOS image sensors with passive pixels and CMOS/MOS image sensors with active pixels are distinguished. An active pixel is configured with means integrated in the pixel to amplify the charge that is collected on the light sensitive element. Passive pixels do not have such means and require a charge sensitive amplifier that is not integrated in the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Such functions can include filtering, operation at higher speed or operation in more extreme illuminations conditions. Examples of such imaging sensors are disclosed in EP-A-0739039, in EP-A-0632930 and in U.S. Pat. No. 5,608,204.

A problem in the art is to reconstruct a color image from the measured information of the pixel array. In order to obtain a colour image, at least three colour coordinates need to be determined in each pixel. Usually, the pixel colour is specified by its Red, Green and Blue (RGB) intensity. To acquire the RGB colour information, the pixels are covered with Red, Green and Blue (or Yellow, Cyan and Magenta) colour filters, one pixel however having only one colour filter type. Thus the colour image captured by a single-chip camera contains only information about one of the three colour channels for each pixel. The two missing colour values must be estimated or reconstructed in each pixel from the information of the neighbouring pixels. This problem is known as "colour filter array interpolation". A simple interpolation method takes the missing RGB values for one pixel from the neighbouring pixels. This method may work for uniform regions on large objects. At edges and regions with a lot of details however, the neighbouring pixels could take radiation from other objects. If that information is used for the RGB interpolation, this results in false colours. For example, when a red pixel (a pixel covered with a red colour filter) detects a black object, while its green and blue neighbour pixels detect a white background, the red pixel is interpolated as a cyan (green+blue) point instead of white.

Examples of "colour filter array interpolation" techniques are disclosed in the publications:

"Interactions between colour plane interpolation and other image processing functions in electronic photography" by J. E. Adams, in SPIE 2416 p 144 (1995); and "A New Digital Signal Processor for Progressive Scan CCD" by H. Zen et al. in IEEE Trans. Cons. Electr. 44, p 289 (1998).

However, the prior art fails to disclose a colour filter interpolation technique that delivers a performing image quality and at the same time is implementable in a sufficiently small electronic system.

AIM OF THE INVENTION

The present invention aims to disclose a colour filter interpolation technique that delivers a performing image quality and at the same time is implementable in a sufficiently small circuit allowing for the construction of a single chip CMOS based colour imaging device.

SUMMARY OF THE INVENTION

In a first object of the invention, a method is disclosed for determining at least two types of corrected aspect values for an aspect of a pixel, said pixel being embedded in a configuration of pixels, the method comprising the step of measuring at least one intensity value corresponding to said aspect for essentially each of the pixels of said configuration of pixels. The configuration of pixels can be part of a sensor for making up images that are reconstructed with the information obtained by a measurement on the pixels. Said aspect of said pixels can be the colour of said pixels and the types of corrected colour values can be the Red, Green and Blue colour values of said pixel. The pixels of said configuration in such embodiment of the invention typically each have one colour filter (for instance Red, Green or Blue) that is physically present upon or adjacent to or abutting the pixel. Therefore the pixels, after an intensity measurement, typically each have one measured intensity value that corresponds to said colour aspect of said pixel as the measured intensity value is influenced by the specific colour filter upon the pixel.

The method of the invention further comprises the steps of determining a first corrected intensity value for said pixel by combining the measured intensity values of a set of pixels out of said configuration of pixels; analysing the measured intensity value of said pixel in said corrected intensity value and a subaspect value; and thereafter determining at least two types of corrected subaspect values for said pixel by combining the subaspect values of a set of pixels out of said configuration of pixels.

The method of the invention can further comprise the steps of determining a second corrected intensity value for said pixel by combining said first corrected intensity value with the corrected subaspect value for said pixel obtained by analysing the measured intensity value in said first corrected intensity value and a subaspect value.

The method can also comprise the step of determining at least two types of corrected aspect values for said aspect of said pixel by combining said second corrected intensity value with two types corrected subaspect values for said pixel. Thus in this way a corrected intensity value is determined with the full resolution of the sensor.

As stated above, said pixel is embedded in a configuration of pixels, the pixels of said configuration of pixels can have at least one measured intensity value corresponding to said aspect. Said aspect of said pixels can be the colour of said pixels and the corrected aspect values of said colour can be the Red, Green and Blue colour values of said pixel.

Said subaspect can be the chrominance of said pixel. The corrected values of said colour are then the Red, Green an Blue value of said pixel and the corrected values of said chrominance are the red, green and blue chrominances of said pixel. The sets of pixels preferably are selected within immediate neighbourhood of, also referred to as a window around, said pixel. Such window or immediate neighbourhood can consist of less than about the hundred or fifty closest neighbour pixels of said pixel or of less than about the twenty or ten closest neighbour pixels in the same row as said pixel. Thus the method of the invention can be about determining at least two corrected colour values for a pixel, said pixel being embedded in a configuration of pixels and having a colour filter for filtering substantially one colour type while obtaining a measurement on the pixel, said method comprising the steps of measuring at least one signal on said pixel; transforming the measured signal into a representation having at least a luminance and a chrominance part; and transforming said representation into a colour space representation of said pixel, said pixel having at least two colour values in said colour space representation. The chrominance is corresponding to a colour.

The method can also comprise the steps of selecting out of said configuration a set of pixels in a region around said pixel; selecting out of said set of pixels a subset of pixels having said one colour; and evaluating the value of said colour for essentially each pixel of said subset of pixels.

The terms combining and analysing as referred to hereabove and further in the specification include operations such as adding and multiplying, respectively subtracting and dividing, and other calculator operations such as vote-operations and median-operations and combinations of all these operations (e.g. making an average by adding a number of values and dividing the final added value by the number). The term aspect of a pixel is meant to mean a characteristic parameter of the pixel that can have an impact on the image or image quality of an image that is made with information measured on the pixel. Values for aspects of pixels can be obtained by measurement or by operation on measured values of the pixel. A pixel can have as an aspect the colour of the pixel. The colour of a pixel in the art typically is constructed as a combination of the Red, Green and Blue colour values of the pixel, or of the Cyan, Magenta and Yellow colour values of the pixel. The intensity or luminance or grey value of a pixel is a measured value being correlated to the intensity of the radiation impinging on the pixel, the differences in intensity of the radiation on the different pixels of the configuration of pixels determining the image that can be obtained with the configuration of pixels. The intensity or luminance or grey value of a pixel is the component of the measured data that does not include any colour information. The chrominance of a pixel is the set of values being correlated to the colour (hue and saturation) values of the pixel. The chrominance is the component of the measured data or signals on the pixel that does not contain any intensity information. A colour can be characterized by its luminance and two chrominances. Two colours having the same set of luminance and chrominance data appear to be the same for a human observer. This principle is called Metamerism. The term corrected value as used throughout this patent application can mean any changed value such as an adapted value or an estimated value or any other kind of changed value.

In a second object of the invention, an electronic system is disclosed for implementing in hardware any of the methods recited above. In a preferred embodiment an integrated circuit, preferably a silicon chip, is disclosed integrating a configuration of pixels within an image sensor and integrating a colour filter interpolation technique, each pixel having a colour filter for filtering substantially one colour type, said chip comprising a finite-impulse-response filter having a delay line for storing of the pixels in the immediate neighbourhood of each pixel of said configuration the measured intensity values corresponding to the colour filters of said pixels.

BRIEF DESCRIPTION OF THE DRAWINGS

Figure 1A:
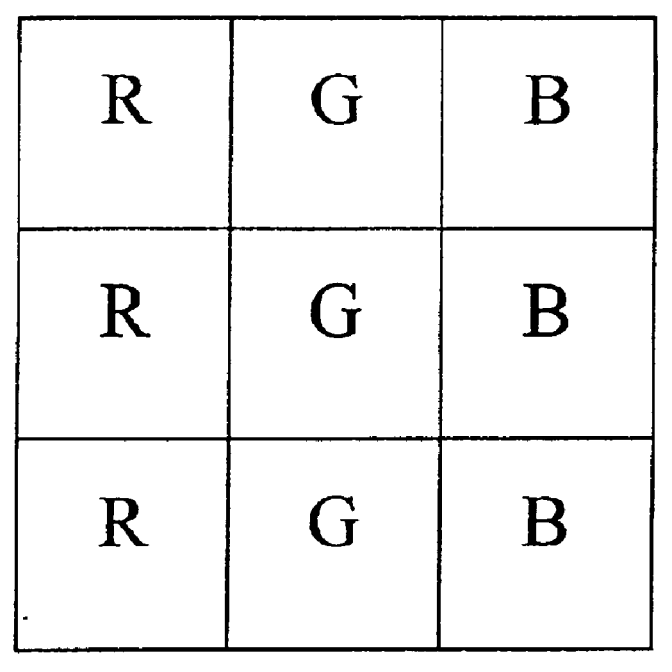
Figure 1B:
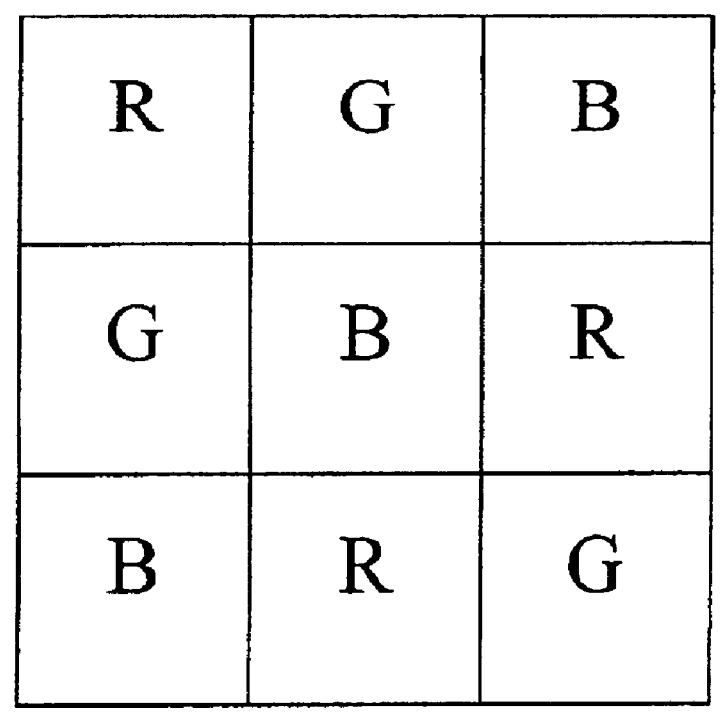

FIGS. 1a, 1b and 1c show several possible colour filter array geometries on configurations of pixels according to the invention.

FIG. 2 shows the basic steps of the colour filter interpolation technique according to a preferred embodiment of the invention.

FIG. 4 describes the colour filter interpolation technique in case of one-dimensional interpolation of RGB stripe filters or an RGB shift pattern.

FIG. 5 shows an example of the 1D interpolation technique for stripe RGB filters; an example is given for the interpolation of a green pixel (a pixel with a green colour filter).

FIG. 7 shows the specifications of a best mode embodiment of the circuit shown in FIG. 6.

FIG. 12 shows an example of the interpolation technique applied to a diagonal RGB filter matrix, and illustrated here for the interpolation of a green pixel (additive method)

DETAILED DESCRIPTION OF THE INVENTION

Figure 1C:
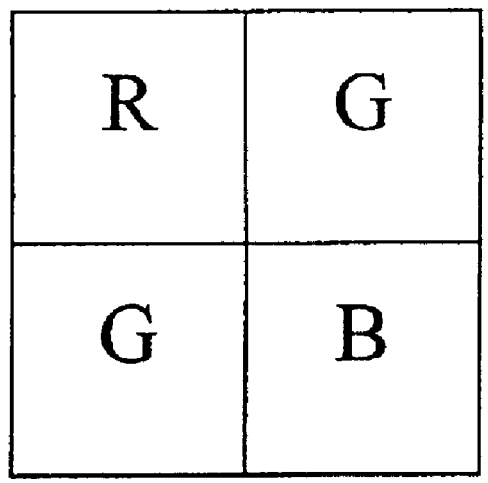

The invention is explained by means of several examples. It will be apparent to the person skilled in the art that other alternative and equivalent embodiments of the invention can be conceived and reduced to practice without departing form the true spirit of the invention, the scope of the invention being limited only by the appended claims.

In a first object of the invention, a method is disclosed for determining at least two types of corrected colour values for a pixel, said pixel being embedded in a configuration of pixels forming an imaging sensor. Said method comprises the steps of:

measuring at least one intensity value corresponding to said colour for essentially each of the pixels of said configuration of pixels;

calculating a first corrected (estimated in a preferred embodiment) intensity or luminance value for said pixel, in the calculation combining the measured intensity values of a set of pixels out of said configuration of pixels;

analysing the measured intensity value of said pixel in said first first corrected (estimated in a preferred embodiment) intensity value and a chrominance value; and thereafter determining at least two types of corrected chrominance values for said pixel by combining the chrominance values of a set of pixels out of said configuration of pixels.

In the examples given below, the types of corrected values of said chrominance are the corrected red, green and blue chrominance values and the corrected colour values are the Red, Green and Blue colour values.

Preferred Embodiments

The invention in the description of the preferred embodiments is a method to determine luminance and chrominances of each pixel of a pixel array covered with colour filters. The method of the invention can be executed in 5 steps as described herebelow.

In the first step, a low-pass filtered luminance image is calculated from the original measured sensor image. In step 2, this luminance image is used together with the sensor image to calculate the chrominance of each pixel of the sensor image. Only the chrominance, which corresponds with the colour filter of the pixel, is calculated. Step 3 is the actual interpolation step. For each pixel, the red, green and blue chrominances are estimated by a vote-operator. This operator is applied for each colour channel to a set of pixels in the neighbourhood of the pixel that is interpolated. It calculates the red chrominance from the chrominance of the red neighbour pixels around the pixel. It calculates the green chrominance from the chrominance of the green neighbour pixels of the pixel. And it calculates the blue chrominance from the chrominance of the blue neighbours. In the fourth step, the high-resolution luminance image is calculated from the sensor image and the estimated red, green and blue chrominances. Step 5 transfers the data to a commonly used colour space. For example, RGB data can be calculated by combining the high-resolution luminance image and the red, green and blue chrominances.

The vote-operator that is used in step 3, eliminates wrong values of the chrominance. At an edge, the chrominance that is calculated in step 2 is wrong, because the low-pass filtered luminance is used to calculate the chrominance. At an edge, a high-resolution luminance should be used instead of the low-pass filtered luminance. The inputs of the vote-operator are (at least 3) estimations of the chrominance. The vote-operator must determine a good chrominance value from these inputs. It is required that there is no dependency between two inputs of the vote-operator. The pixels, from which the inputs of the operator are calculated, preferably are different. In a preferred embodiment of the invention, the vote-operator first eliminates all wrong chrominance estimations for the pixel that is interpolated, and it then averages the remaining (correct) values. In its simplest form, the vote operator is a median calculator. A better operator eliminates first the chrominance values with a large difference from the average or median chrominance values. In a second step, the operator calculates the average of the remaining chrominances. This operator is better, because the averaging reduces the noise, while wrong estimations of the chrominance are eliminated, because they typically have a large deviation from the correct value.

The advantage of this approach is that the method eliminates false colours with a simple method. In one specific implementation of the method, the method does not need any more information than the last 11 pixels that were read out by the sensor. The memory requirements for the method are low and the computational load is limited. Therefore, this method is especially suited for an implementation in a small circuit that can be put on a single-chip camera. Another advantage compared to other prior art approaches is that the noise of the chrominance channels on uniform objects can be reduced. A third advantage of this method is that the luminance is reconstructed with the full resolution of the sensor. Spatial low-pass filtering is only done in the chrominance domain. This is an advantage, because human observers are much more sensitive to luminance variations than to variations in the chrominance channels.

Another preferred embodiment of the method of the invention is described herebelow.

In each pixel of an image sensor, only one colour coordinate is measured. This is done by a colour filter on top of each pixel. The colour filter array or CFA has a specific geometry.

FIG. 1 show several possible CFA geometries with primary RGB colours:

FIG. 1a: stripe RGB filters, the colour filters are columns on the pixel matrix

FIG. 1b: diagonal RGB filters or shift patterns;

FIG. 1c: the so-called "Bayer" pattern, a 2×2 pattern with 2 green, and 1 red and blue pixel.

The interpolation method described here interpolates the missing colour coordinates in each pixel. It is not limited to the above colour filter array patterns. Other patterns, even with other colours, could also be used.

The implementation of the method will be mainly illustrated with stripe or diagonal RGB filters of FIGS. 1a and 1b.

Figure 3:
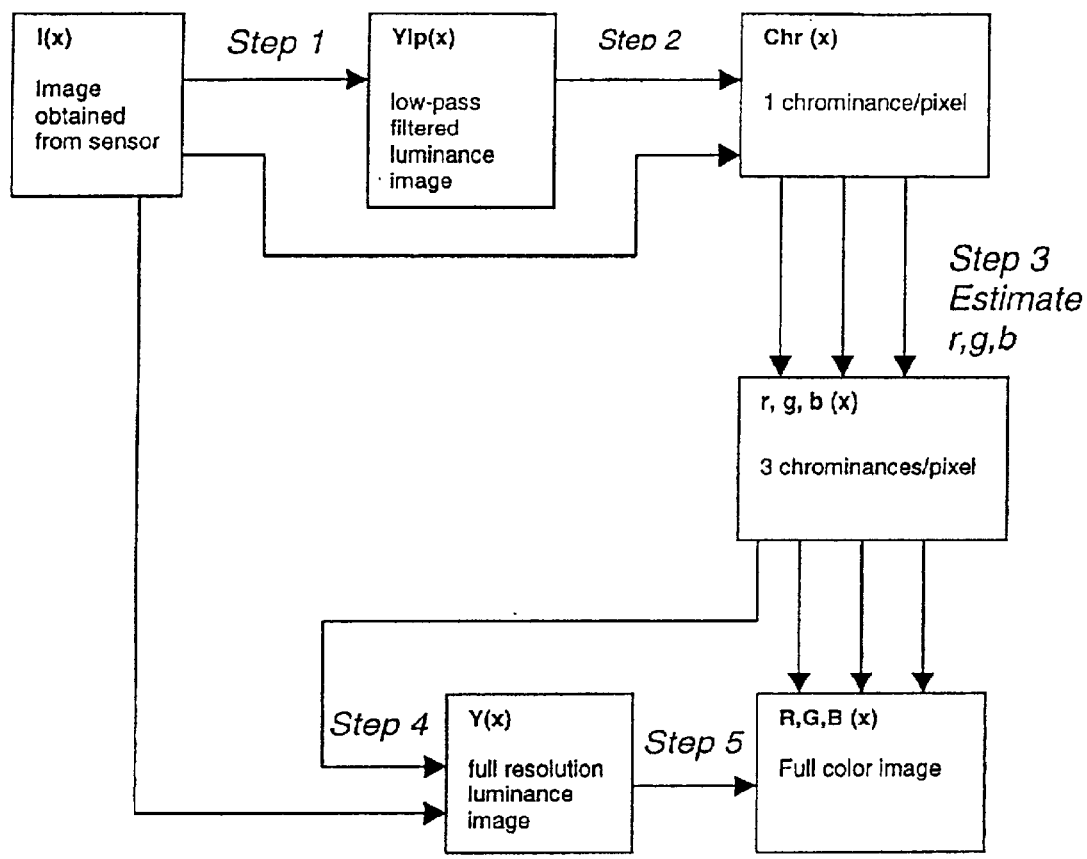
FIG. 3 shows the flowchart of image data for the colour filter array interpolation according to a preferred embodiment of the invention.

FIG. 2 shows 5 steps of the interpolation method. In addition, FIG. 3 illustrates how the image data flows through the method. It also shows which data is needed for each step of the method.

In step 1 of the method, a low-pass filtered luminance image is calculated from the sensor image. The luminance (or intensity or grey level) is the component of the pixel data that does not include any colour information. This luminance image can be obtained by averaging pixels of different colour channels in each pixel. E.g. for the pattern of FIG. 1a or 1b, the following formula could be applied:

$$Ylp(x,y) = \{I(x-1,y) + I(x,y) + I(x+1,y)\}/3$$

with I(x,y) the measured image sensor data for the pixel at position (x,y) and Ylp(x,y) the low-pass filtered luminance of the pixel at position (x,y). The above formula is correct because the pixels at positions (x−1,y); (x,y) and (x+1,y) each have a different colour filter. Optionally, also other neighbours could be taken into account when Ylp(x,y) is calculated. Calculating the Ylp(x,y) information from a region as small as 3 pixels seems to yield a good result. Eventually, weighting coefficients could be used, in order to obtain a better estimation of the luminance, due to differences in the color filter transmittances for the different color channels.

In step 2, the chrominance of the pixel is calculated. The chrominance of the pixel is the component that contains the colour information. It is independent of the intensity level (which is the luminance). Normally, two coordinates characterise the chrominance. Three chrominances are used, which correspond to the colour channels of the colour filters. The sum of these 3 chrominances is 1, so only two values are independent. Normally, the red, green and blue chrominances are used (r, g and b). In this step of the interpolation method, only the chrominance of the channel that corresponds to the colour filter on top of the pixel, is calculated. So, on a pixel with a red filter, the red chrominance is calculated; on a green pixel, the green chrominance is calculated; and on a blue pixel, the blue chrominance is calculated.

There are 2 ways to calculate chrominance: the additive and the multiplicative colour processing approach. The additive approach assumes that the pixel colour is the sum of luminance and chrominances:

$$R = Y + r$$

$$G = Y + g$$

$$B = Y + b$$

Y is the luminance; r, g and b are the chrominance values; and R, G, B are the colour data in RGB space.

The multiplicative approach assumes that luminance and chrominance must be multiplied.

$$R = Y * r$$

$$G = Y * g$$

$$B = Y * b$$

With the additive approach, the chrominance chr(x,y) is calculated by subtracting the low-pass filtered luminance from the sensor data:

$$chr(x,y) = I(x,y) - Ylp(x,y)$$

With the multiplicative approach, the chrominance chr(x, y) is obtained by the division of the sensor data by the low-pass filtered luminance:

$$chr(x,y) = I(x,y)/Ylp(x,y)$$

Sometimes, the image data is transferred into the logarithmic domain before the chrominance calculations. The multiplicative operations become additive. These additions are much easier to implement in hardware, or faster to calculate in software.

For complementary (Cyan, Magenta, Yellow) colours, the chrominance image can be calculated in the same way, but with a complementary chrominance value, or the data can be transferred to red, green and blue colour channels.

Finally, also for the calculation of the chrominances, weighting coefficients can be used.

At edges and regions with high detail, the chrominances that are calculated in this step of the method may contain errors. This is so, because only a low-pass filtered luminance is used to calculate the chrominance instead of the full resolution luminance. The high-frequency luminance components are absent in the low-res luminance image. Because of the chrominance calculation, these components appear in the chrorninance instead of in the luminance.

Step 3 of the method is the interpolation step. Up until here, only one single colour information is available in each pixel. Moreover, this information is not good or correct in pixels with a high level of spatial details. Step 3 interpolates the chrominance information of all 3 colour channels from the chrominance information in a region around the pixel.

r(x,y)=estimated from the red pixels in a region around (x,y)

g(x,y)=estimated from the green pixels in a region around (x,y)

b(x,y)=estimated from the blue pixels in a region around (x,y)

The region from which the pixels are taken, is called the "interpolation window". The estimation of each chrominance is done by a "vote"-operator. This operator must estimate which of the chrominances of the interpolation window are correct and which are wrong. Normally, only a minority of the chrominances is wrong. That explains why it is called a "vote"-operator: the chrominance with the majority of votes is considered as the correct value. The simplest vote-operator is a median operator. This takes the median of all chrominance values at its input. E.g. in case of a region of only 3 pixels large, this looks for the red channels as:

r(x,y)=median{chr(x+r1,y+r1), chr(x+r2, y+r3), chr(x+r3,y+r3)} with red pixels on locations(x+r1, y+r1), (x+r2, y+r2) and (x+r3,y+r3).

A better vote-operator selects first which of the chrominances of the interpolation window are correct and which are "wrong". The "wrong" chrominances are calculated from one or more pixels that look at a different object. After the selection of the correct chrominances, the vote-operator calculates the average value of the correct chrominances. Such an operator could be made, because typically, the correct chrominances are all almost identical and there is a large difference between a wrong chrominance and the correct ones.

This looks as follows:

r(x,y)=vote{chr(red pixel 1), chr(red pixel 2) . . . , chr(red pixel n)} with a vote operator as follows:
 1. chrm=median(chr(1),chr(2), . . . chr(n));
 2. i=0; sum=0;
 3. for all chrominances chr(n):
    3.1 if |chr(n)−chrm|<THRESHOLD
        3.1.1 i=i+1;
        3.1.2 sum=sum+chr(n);
 4. if (i!=0) return(sum/i) else return(median(chr(1),chr(2), . . . , chr(n));

The THRESHOLD in the above method sets how much the chrominance might deviate from the average value. Alternatively, the average value might be used in step 1 of the vote operator instead of the median value. The advantage of the above vote-operator compared to a simple median operator is that the averaging of the correct values reduces the noise. Meanwhile, the operation eliminates signals with a large difference from the normal value, which would lead to false colours if they were used.

The chrominances at the input of the vote-operator might be "wrong" values, because of two major reasons:
1) there are details with a higher spatial frequency than the highest frequency of the low-pass filtered image calculated in step 1 of the method; or 2) the location of the chrominance is too far away from the pixel that is interpolated.

In the latter case, the chrominance is correct for the pixel at the location of the chrominance, but not for the pixel that is interpolated. These chrominances might not be used for the chrominance interpolation. Therefore, the size of the interpolation window (the region around the pixel of which the chrominances are taken) is an important parameter of the method. This window size depends on several factors. First of all, there is the size of the region of pixels from which the Ylp(x,y) image was calculated. The larger this region is, the lower the highest resolution in the Ylp(x,y) image, and the more chrominance errors appear in the chr(x,y) image. So, the larger the region for the Ylp(x,y) calculation, the larger the region that is needed for interpolation of the chrominances. That is the reason why it is preferred to use only 3 pixels to calculate Ylp(x,y). This yields the lowest number of errors in the chr(x,y) image.

There is a second parameter that determines the size of the interpolation window. The method used to calculate Ylp(x,y) determines from which pixels the chrominances are interpolated. The vote-operator must have at its input several (at least 3) chrominances chr(x,y) which are totally independent of each other. If there is a dependency between two chrominances at the input, and both are wrong, it might happen that the vote-operator selects this wrong value. This is typically the case if one of the neighbouring pixels looks at an object with a different colour and if this pixel is used to calculate two chrominances. It is as if this pixel would have two votes instead of one for the decision of the colour of the interpolated pixel. This is not the kind of vote-operation that is wanted. Therefore, the inputs of the vote-operator must be calculated from totally different pixels. These inputs are the chrominances which are calculated in step 2 from the Ylp(x,y) data. This "independence rule" only applies to the inputs of one vote operator. Of course, the same pixels might be used to calculate red, green and blue chrominances. These chrominances appear each in a different vote-operator. There is one exception to this rule. The data of the pixel that is being interpolated might be used in the calculation of every input of the vote-operator (of course, because this pixel cannot look at a different object than the pixel that is interpolated).

Of course, the colour filter array geometry is also a parameter that determines how the interpolation window looks like. It determines which pixels must be used to calculate Ylp and the 3 chrominances.

In step 4 of this embodiment of the method, the full resolution luminance is calculated from the sensor data and the interpolated chrominance values. This is done with the following equation:

$$Y=I(x,y)-\{r \text{ or } g \text{ or } b\}(x,y)$$

for additive colour processing $$Y=I(x,y)/\{r \text{ or } g \text{ or } b\}(x,y)$$

for multiplicative colour processing

With $\{r \text{ or } g \text{ or } b\}$, it is meant that the chrominance must be selected which corresponds with the colour filter at position (x,y).

At this point, the image has been fully estimated. All chrominances (r,g,b) and the high-resolution luminance Y are available. The data can now be transferred into any colour space. This is done in step 5. As an example, data in RGB space can be calculated as follows:

$$R(x,y)=Y(x,y)+r(x,y)$$

$$G(x,y)=Y(x,y)+g(x,y)$$

$$B(x,y)=Y(x,y)+b(x,y)$$

for additive colour processing or $$R(x,y)=Y(x,y)*r(x,y)$$

$$G(x,y)=Y(x,y)*g(x,y)$$

$$B(x,y)=Y(x,y)*b(x,y)$$

for multiplicative colour processing

This step ends the interpolation method.

The method can also be used when the camera is covered by complementary colour filters. The approach remains the same. First, the low-pass filtered luminance image is constructed and one single chrominance for each pixel is calculated. Then, the chrominances are interpolated using a vote-operator on the chrominances of an interpolation window. After the interpolation, the complementary chrominances can be transferred into any colour space. Alternatively, the complementary chrominances might be transferred into red, green and blue chrominances already before step 3 of the method. The only requirement is still the same: the inputs of the vote-operator must be calculated with different pixels (the "independency rule"). As an example, two particular implementations of the method for two specific CFA geometries will be described hereunder.

The first example is for a shift RGB pattern like the one of FIG. 1b. The data achieved from the centre around pixel B5 looks as follows:

| R1 | G2 | B3 |
| G4 | B5 | R6 |
| B7 | R8 | G9 |

Step 1: Calculate in Each Pixel of the Image $$Ylp(x,y)=\{I(x-1,y)+I(x,y)+I(x+1,y)\}/3$$

Step 2: Calculate

| r1 = R1/Ylp1 | g2 = G2/Ylp2 | b3 = B3/Ylp3 |
| g4 = G4/Ylp4 | b5 = B5/Ylp5 | r6 = R6/Ylp6 |
| b7 = B7/Ylp7 | r8 = R8/Ylp8 | g9 = G9/Ylp9 |

Step 3: Calculate $$r=\text{vote}\{r1, r6, r8\}$$

$$g=\text{vote}\{g2, g4, g9\}$$

$$b=\text{vote}\{b3, b5, b7\}$$

with vote the vote-operator discussed before, or a median operator.

Step 4: Calculate $$Y=B5/b$$

Step 5: Calculate $$R=Y*r$$

$$G=Y*g$$

$$B=Y*b$$

The above example is shown for the multiplicative approach.
Alternatively, a 3×3 window could be used, if the low-pass filtered luminance in step 1 is calculated as:

$$Ylp1=\{R1+G2+B3\}/3$$

$$Ylp2=\{R1+G2+B3\}/3$$

$$Ylp3=\{R1+G2+B3\}/3$$

$$Ylp4=\{R4+G5+B6\}/3$$

$$Ylp5=\{R4+G5+B6\}/3$$

$$Ylp6=\{R4+G5+B6\}/3$$

$$Ylp7=\{R7+G8+B9\}/3$$

$$Ylp8=\{R7+G8+B9\}/3$$

$$Ylp9=\{R7+G8+B9\}/3$$

In this approach, only the information of the pixel and its 8 neighbours is used. It is more likely that the neighbouring pixel still looks at the same object, then that the pixel that is two columns away looks at the same object. Therefore, with the approach with the 3×3 window, there are less wrong inputs for the vote-operator. The more equal the inputs of the vote operator are, the lower the noise of the chrominance data is. A similar example, but with additive color processing, is given in FIG. 12.

The second example of the method is for stripe RGB filters. The method interpolates the missing colour values by looking at the 5 left and 5 right neighbours of the pixel, on the same row as the pixel that is interpolated. This is a so-called 1-dimensional interpolation, because no data is used from the rows above or below the pixel that is interpolated. FIG. 4 shows the method for this specific situation. FIG. 5 is another representation of the method.

In the first step, the low-pass filtered luminance is calculated in the 9 pixels around the pixel that will be interpolated. The low-pass filtered luminance Ylp(x) can be calculated as the sum of three RGB values of neighbouring pixels. On each of the three neighbouring pixels, one of the RGB values is obtained.

The second step calculates the chrominance of each of these 9 pixels. Only the chrominance that corresponds to the colour channel of the colour filter on top of the pixel is calculated. This can be calculated from the data of the pixel and the low-pass filtered luminance Ylp. There are two ways to do this. There is the additive approach and the multiplicative approach. In step 3, the chrominances are interpolated. Again, a vote-operator is used. This operator could be a median filter or a more advanced operator. The operator contains three inputs, which are all 3 calculated from different pixels. The inputs of the operator are thus independent from each other. Step 4 calculates the luminance and step 5 calculates the RGB data.

In a second object of the invention, a device being a hardware implementation of the method of the invention is disclosed. Herebelow a CMOS based silicon chip is disclosed, the chip integrating a configuration of pixels within an image sensor and integrating a colour filter interpolation technique, each pixel having a colour filter for filtering substantially one colour type, said chip comprising a finite-impulse-response filter having a delay line for storing of the pixels in the immediate neighbourhood of each pixel of said configuration the measured intensity values corresponding to the colour filters of said pixels.

Figure 6:
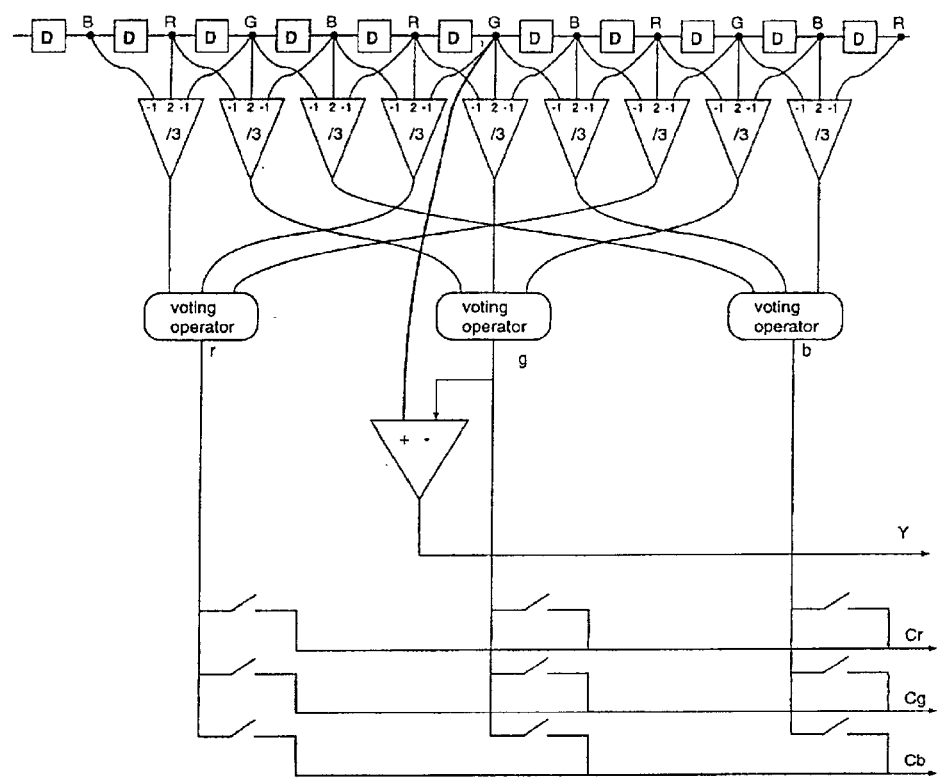
FIG. 6 shows a possible implementation of the interpolation technique of FIGS. 4 and 5 in a finite impulse response filter architecture (additive method).

The 1D method according to the method of the invention could also be applied to so-called "shift"-RGB patterns, like the one of FIG. 1b. The advantage of this method is that it does not require any information from the previous rows of the array of pixels. Therefore; this method does not require much memory. Only the last 11 pixels that were read out, must be memorised for short time. This can easily be done in the digital or the analog domain. Therefore, this method is suited for an implementation into a small digital or analog circuit. The 1D method can be represented in another way, which looks as a finite-impulse response filter. This representation is shown in FIG. 6. It is an implementation for additive colour processing.

On top, there is an 11-stage delay line. This delay line memorises the last 11 pixels that were read out. The R, G and B labels show where red, green and blue pixels are stored during one particular clock period. During the next clock period, all pixels shift one stage to the right. Colours are then stored on different elements. The amplifiers underneath the delay line calculate the chrominance:

$$chr(x)=I(x)-Ylp(x)=\{2I(x)-I(x-1)-I(x+1)\}/3$$

The 3 chrominances of each colour channel are processed by the vote-operator. For each colour channel, a chrominance is calculated. This is step 3 of the method. The difference between the middle tap of the delay line and the output of the middle vote-operator is the high-resolution luminance Y. Finally, a bench of switches puts the outputs of the vote-operators on the right colour channel. Every clock period, the vote operators calculate a different colour channel. The schematic of FIG. 6 outputs the chrominances and the luminance separately. Step 5 of the method is not shown in this Figure.

The schematic of FIG. 6 can easily be transferred into a digital or analog silicon circuit. An analog circuit has been made, based on FIG. 6. This small circuit can be part of an image sensor. This image sensor can output directly the interpolated colour data.

The vote operator can be implemented in an analog circuit. This circuit can contain 3 operational transconductance amplifiers, connected as unity followers, with their outputs connected together. When all 3 inputs of this circuit are different, this circuit calculates the median value. If two of the inputs are almost equal, while the third value is completely different, the average value of the two equal signals is calculated. And when all 3 signals are about the same, the average of all 3 signals is calculated. This behaviour is exactly what a good vote-operator should do.

A best mode implementation of the device of the invention is summarised in FIG. 7.

The method of the invention was realised in a chip, which is called "PR 16". The architecture and the performance of this circuit are described hereunder.

The PR 16 circuit works on a 11×1 pixel kernel and it is designed so that it works on a serial stream of pixel data. This makes it possible to implement the method in an analog circuit. The architecture of this implementation is the one of FIG. 6.

A delay line is used to store the information of the last pixels which were read out. In FIG. 6, the delay line is shown on top. On every pixel period, the memorised pixels shift one stage further. The "R", "G" and "B" labels on the delay line correspond with one particular clock period, where the nodes of these labels store information from red, green and blue pixels. The 9 amplifiers right underneath the delay line calculate the chrominances. They execute step 1 of the interpolation method. The signals of 3 of these amplifiers correspond with one particular colour channel. These signals are median filtered, this is step 2 of the interpolation method. Steps 3, 4 and 5 of the method are executed in the two amplifiers at the bottom. They subtract the chrominance of the middle pixel from the signal of this pixel, which yields the luminance, and at the same time, they add the chrominance. The signals are then switched to the right output by a bench of 9 switches controlled by 3 control signals. Every time when a new pixel is accessed, the outputs of the median circuits correspond with other colour channels. The switches put the right signal to the right colour channel.

The design of the delay line is not straightforward. The delay line is 11 stages long. If the open-loop gain of the amplifiers in the delay line is too small, the signal of the last stage will be attenuated too much. The amplifiers might also not suffer from large offset variations. Otherwise, it would yield uncorrect output data Another issue is the noise. The noise of circuit is determined by the aliasing of the amplifier and kTC noise by the sampling in the delay line. If the delay line of the missing pixel circuit is simply extended to 11 stages, the noise will become too high.

Therefore, the delay line can be designed as follows. The value of the sample & hold capacitors is 400 fF in order to keep the kTC noise and the bandwith low(and consequently the noise aliasing low enough). For the amplifiers, folded cascode OTAs were used. These have a large open-loop gain. The low-frequency gain is 5330, the gain-bandwith is 65 MHz and the phase margin is 65°.

On the PR 16, a mode is foreseen to output the 11th stage of the delay line. The noise was measured on this output to analyse the sampling noise in the delay line. The noise is calculated as the RMS variation of one particular sample in the output signal. The input for this measurement is a block waveform with 0.6 V amplitude. The delay line is clocked at 8 MHz. Several measurements were done with this waveform located at several levels in between 2 and 4 V. The RMS variation of the output was less than 1.3 mV RMS.

The 9 amplifiers which calculate the chrominance are also critical. Miller OTAs can be used with an open-loop gain of 472. They are configured to calculate the chrominance signal.

The median filters used here are true median circuits. They contain 3 comparators (identical to these of the missing pixel correction circuit) and switches which select the middle of the 3 signals.

For the calculation of the two missing colour coordinates, again a Miller OTA is used. It is the same amplifier as for the chrominance calculation, but in another configuration.

The circuit is completed with the switches and a sampling stage for each colour channel. This sampling stage is identical to one delay line stage. Three output amplifiers complete the design.

Figure 8:
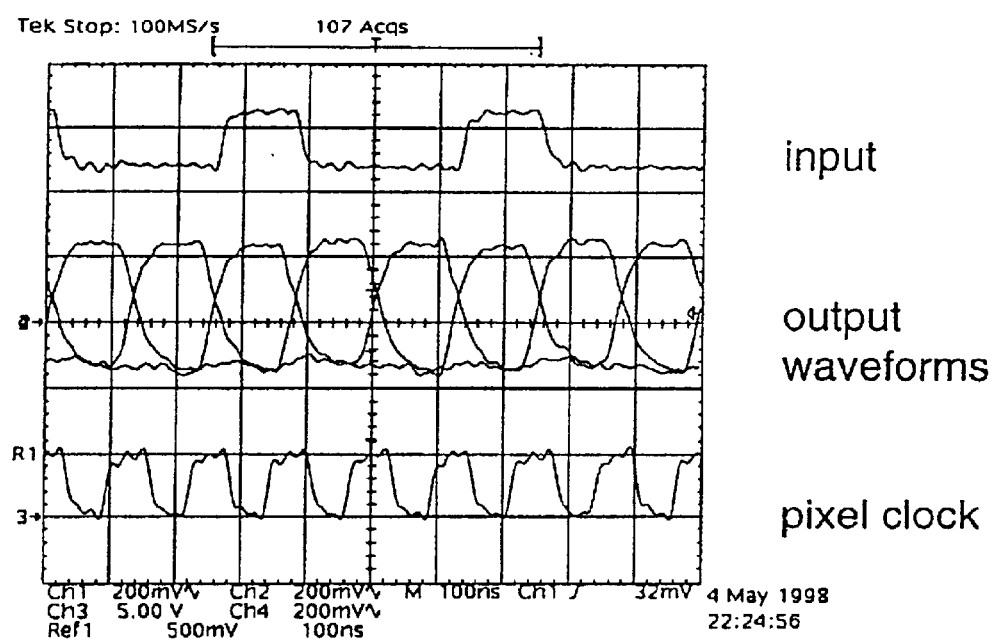
FIG. 8 shows the behaviour of the chip according to the best mode embodiment, the method of the invention is realised on the chip in case of an illumination with one single colour.

FIG. 8 shows the output signals measured on the PR 16, in a typical situation, wherein:
Upper waveform: input.
Middle waveforms: output of the three colour channels before the switching bench.
Lower waveform: 8 MHz pixel clock.

The input waveform emulates the situation when the camera looks at one particular colour. Two pixels are sampled with an input voltage of 2.2 V. The third pixel has an input voltage of 2.6 V. The pixel clock runs at 8 MHz. In this setup, the bench of switches is not driven. These switches are constant, and consequently, the red, green and blue outputs toggle between the 3 different outputs. The output waveforms are then as shown in the middle: their amplitude is 400 mV, as it should be, and they are all three the same. Of course, in a real situation, the switches are controlled by the camera logic. The outputs would then be constant, two of them are equal and the third one is 400 mV higher.

Figure 9:
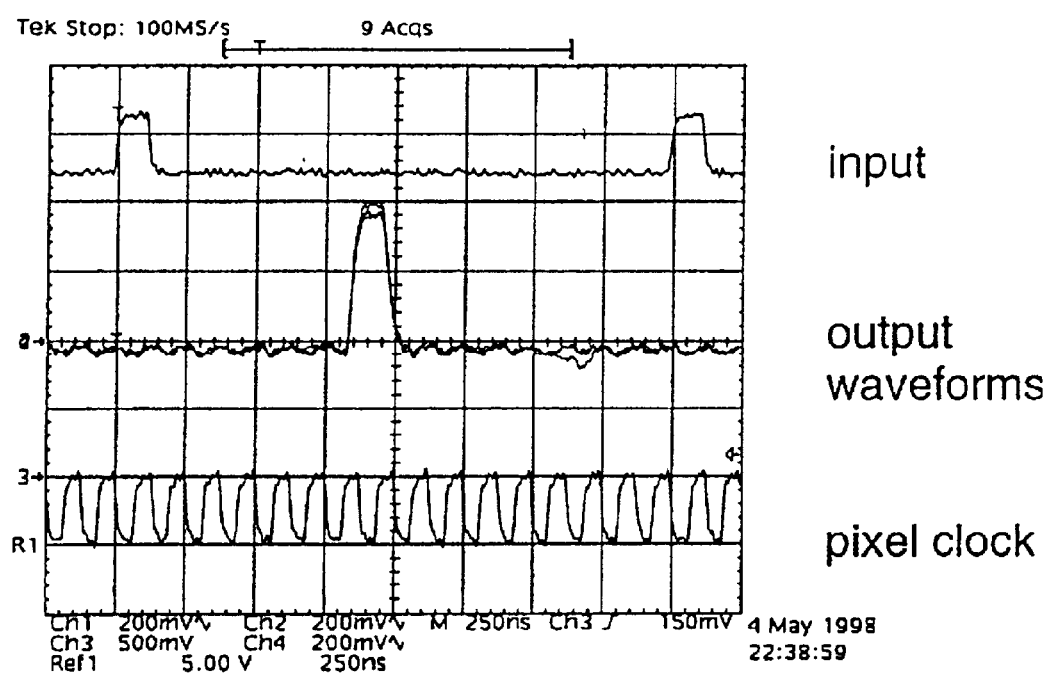
FIG. 9 shows the behaviour of the chip on which the method of the invention is realised in case of a signal with a missing pixel.

FIG. 9 shows the situation in case of a bad pixel, wherein:
Upper waveform: input.
Middle waveforms: output of the three colour channels before the switching bench.
Lower waveform: 8 MHz pixel clock.

The input is constant, but only one pixel has a higher output (400 mV higher). On the output waveforms, one can see that all three channels respond in the same way to this situation. This is the behaviour expected from the method. The single white pixel appears as a white spot. Eventually, such a missing pixel can be eliminated with a correction circuit.

Figure 10:
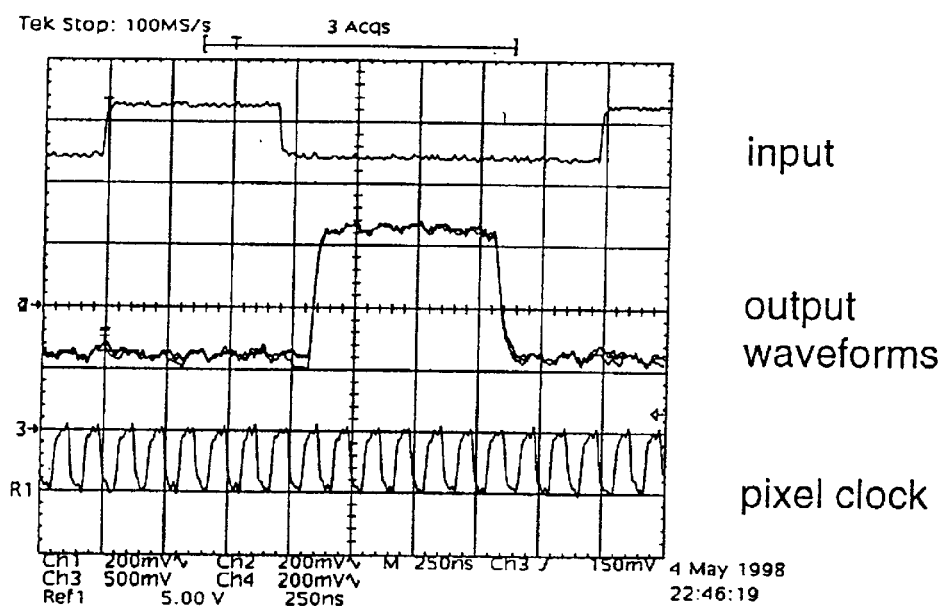
FIG. 10 shows the behaviour of the chip on which the method of the invention is realised in case of a grey illumination with a jump in intensity.

Finally, FIG. 10 shows the behaviour of the PR 16 in case of a jump in intensity, wherein:
Upper waveform: input.
Middle waveforms: output of the three colour channels before the switching bench.
Lower waveform: 8 MHz pixel clock.

This emulates the situation where the camera looks at a grey scene with two grey levels. One can see on the output waveforms that the behaviour of all three channels is identical. The reconstruction is thus a correct jump in intensity, without false colours.

The noise was measured by applying the waveform of FIG. 10 to the input of the chip. The RMS variation on the measured output voltages were calculated. This is for all channels less than 1.3 mV if the input waveform is located between 2 and 4 Volts. The chip dissipates 100 mW from a single 5 Volt supply at 8 MHz pixel frequency. Most of the dissipation is in the delay line and in the three output amplifiers (3×15 mW).

The PR 16 circuit outputs the red, green and blue channels. For the generation of video signals, the separate luminance and chrominance signals are necessary. They can be reconstructed from the RGB signal, but there is a more practical way: the interpolation circuit itself can be made so that it outputs the Y-Cr-Cb signal (this is the case in the implementation of FIG. 6). A second advantage of these signals is that they make it possible to amplify separately the luminance (for contrast adjustment) and the luminance (for white balance and colour saturation). The chrominances are available as the outputs of the median filter or "vote" operator. They can easily be outputted after selecting the right chrominance to the right output channel. Three chrominances are available: besides the classical red and blue chrominances, there is also the green chrominance.

Figure 11:
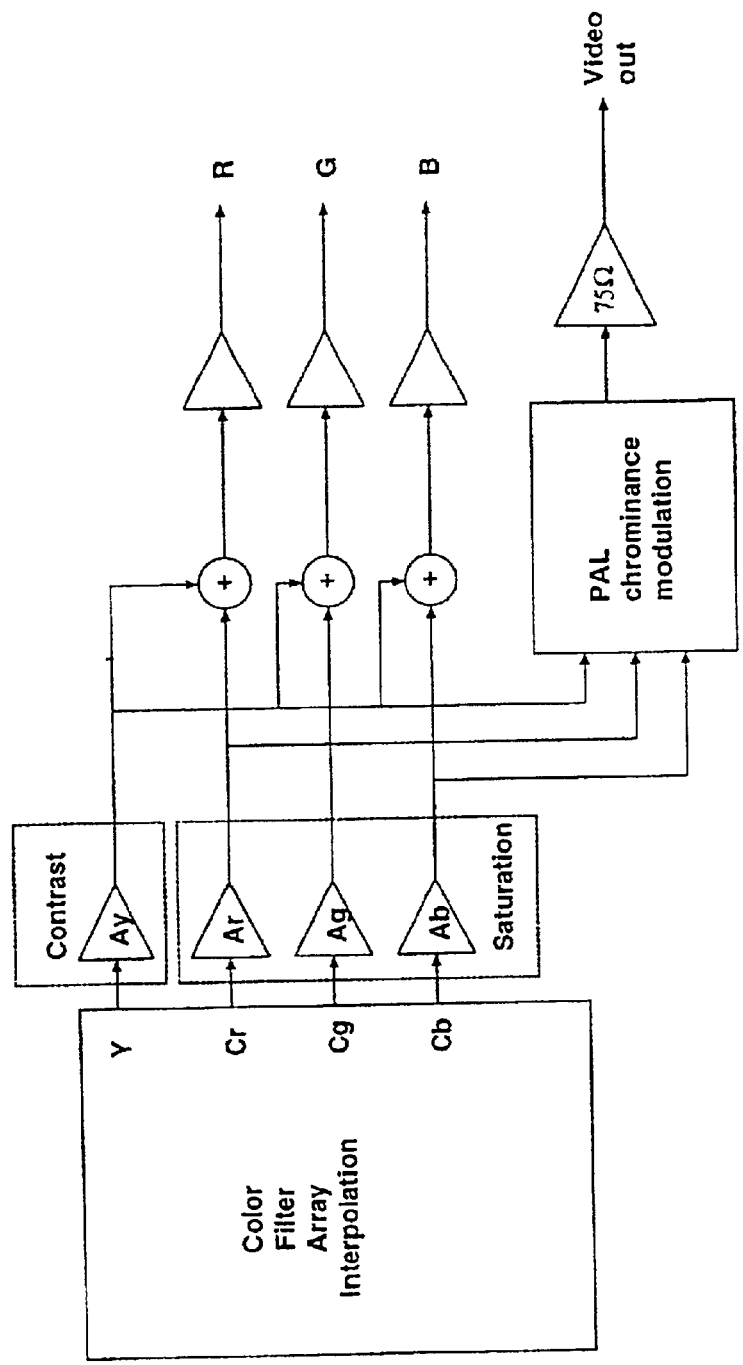
FIG. 11 shows the signal treatment after interpolation, contrast and colour saturation adjustment and generation of RGB and PAL composite video signals.

The path of the signals after interpolation is as illustrated in FIG. 11. The luminance signal is amplified for adjusting the contrast. The chrominance signals are adjusted for the white balance and amplified for colour saturation. Eventually, a colour matrix can be applied to correct the colour channels. Both signals can be added together to reconstruct the red, green and blue channels, or the Y-Cr-Cb signal can be used to generate a video signal.

If necessary, a missing pixel correction circuit can be used. It must be applied only to the luminance signal. The chrominance signals do not need to be processed, because pixel faults do not appear in the chrominance. They are filtered out by the median filters which are used for the chrominance calculation.

What is claimed is:
1. A method for determining at least two types of corrected aspect values for an aspect of a pixel, said pixel being embedded in a configuration of pixels, said method comprising the steps of:

measuring at least one intensity value corresponding to said aspect for essentially each of the pixels of said configuration of pixels;

calculating a first corrected intensity value for said pixel, in the calculation combining the measured intensity values of a set of pixels out of said configuration of pixels;

decomposing the measured intensity value into said first corrected intensity value and a subaspect value;

determining a second corrected intensity value for said pixel by combining said first corrected intensity value with the corrected subaspect value for said pixel obtained by analysing the measured intensity value in said first corrected intensity value and a subaspect value; and thereafter determining at least two types of corrected subaspect values for said pixel by combining the subaspect values of a set of pixels out of said configuration of pixels, wherein said aspect is the colour of said pixel and wherein said subaspect is the chrominance of said pixel, wherein the types of corrected values for said colour are Red, Green, and Blue corrected colour values for said pixel and wherein the types of corrected values of said chrominance are the corrected red, green and blue chrominance values, wherein said pixel has a colour filter for filtering substantially one colour type while measuring said intensity value.

2. The method as recited in claim 1 further comprising the step of determining at least two types of corrected aspect values for said aspect of said pixel by combining said second corrected intensity value with two types corrected subaspect values for said pixel.

3. The method as recited in claim 1, wherein said set of pixels out of said configuration of pixels used for determining a first corrected intensity value for said pixel, and said set of pixels for determining at least two corrected subaspect values for said pixel consist of pixels in the immediate neighbourhood of said pixel.

4. The method as recited in claim 1, wherein the corrected subaspect values for said pixel are determined using a vote-operator and/or a median-operator operating on the subaspect values of a set of pixels out of said configuration of pixels.

5. The method as recited in claim 4 wherein the corrected subaspect value of one type is calculated with the subaspect values of the same type of said set of pixels.

6. The method as recited in claim 5 further comprising the steps of:

selecting said set of pixels for determining the corrected subaspect values for said pixel within the immediate neighbourhood of said pixel;

selecting for each type of subaspect values a subset of subaspect values out of the subaspect values of said set, said subset meeting a deviation threshold criterion and the subaspect values being of one type; and combining and averaging the subaspect values of said subset in order to determine the corrected subaspect values for each type of corrected subaspect values.

7. The method as recited in claim 1 wherein the step of determining a first corrected intensity value for said pixel by using the measured intensity values of a set of pixels out of said configuration of pixels, includes a low-pass filter calculation.

8. An electronic system implementing in hardware the method of claim 1.

9. The system as recited in claim 8 being a silicon chip, said chip integrating a configuration of pixels of an image sensor and a colour filter interpolation technique, each pixel having a colour filter for filtering substantially one colour type, said chip comprising a finite-impulse-response filter having a delay line for storing of the pixels in the immediate neighbourhood of each pixel of said configuration the measured intensity values corresponding to the colour filters of said pixels.

* * * * *